US005656116A

United States Patent [19]

Soltysiak

[11] Patent Number: 5,656,116
[45] Date of Patent: Aug. 12, 1997

[54] REFINEMENTS IN METHOD AND APPARATUS FOR MANUFACTURING LINERLESS LABELS

[75] Inventor: John R. Soltysiak, Blasdell, N.Y.

[73] Assignee: Moore Business Forms, Inc., Grand Island, N.Y.

[21] Appl. No.: 399,629

[22] Filed: Mar. 7, 1995

Related U.S. Application Data

[63] Continuation-in-part of Ser. No. 253,787, Jun. 3, 1994, Pat. No. 5,518,762.

[51] Int. Cl.[6] .............................. B32B 31/12; B05C 5/04; B05D 1/26

[52] U.S. Cl. .............................. 156/277; 156/289; 118/667; 427/208.2; 427/208.4

[58] Field of Search .............................. 118/410, 411, 118/419, 667, 684; 156/252, 277, 278, 289; 427/208, 208.2, 208.6, 208.8, 208.4

[56] References Cited

U.S. PATENT DOCUMENTS

| | | | |
|---|---|---|---|
| 4,528,055 | 7/1985 | Hattemer | 156/247 |
| 4,589,141 | 5/1986 | Christian et al. | 382/14 |
| 4,851,383 | 7/1989 | Fickenscher et al. | 503/200 |
| 4,886,680 | 12/1989 | Tindall | 427/8 |
| 5,090,942 | 2/1992 | Traise | 462/66 |
| 5,141,915 | 8/1992 | Roenigk et al. | 503/227 |
| 5,294,258 | 3/1994 | Jarrell et al. | 118/410 |
| 5,354,588 | 10/1994 | Mitchell et al. | 428/40 |
| 5,423,935 | 6/1995 | Benecke et al. | 156/291 |
| 5,518,762 | 5/1996 | Soltysiak et al. | 427/208 |

*Primary Examiner*—David A. Simmons
*Assistant Examiner*—J. A. Lorengo
*Attorney, Agent, or Firm*—Nixon & Vanderhye P.C.

[57] ABSTRACT

An apparatus and method provide for the alternate manufacture of permanent adhesive or repositional linerless labels utilizing the same equipment. Indicia is applied such as by using a flexographic unit in which the print cylinders are immediately thrown-off the web when the unit is turned off. Coating stations apply a repositional adhesive and release coat in the construction of repositional adhesive labels, for example, using a flexo unit in which the print cylinder stays in contact with the web after the unit is turned off to wipe excess adhesive from the print cylinder. In the construction of permanent adhesive labels a coating station for applying a release coat and a release coat curing station, as well as a hot melt permanent adhesive application station, are also provided. The permanent adhesive is applied with a slotted die head having a heat uniformity of ± five degrees F across its length, and applies an even adhesive coat thickness of about 0.0005–0.001 inches to ± about 0.0001 inches.

16 Claims, 3 Drawing Sheets

REFINEMENTS IN METHOD AND APPARATUS FOR MANUFACTURING LINERLESS LABELS

CROSS REFERENCE TO RELATED APPLICATIONS

This application is a continuation-in-part of application Ser. No. 08/253,787 filed Jun. 3, 1994, now U.S. Pat. No. 5,518,762.

BACKGROUND AND SUMMARY OF THE INVENTION

Linerless labels are becoming increasingly more popular due to the inherent advantages associated therewith, as a result of not requiring a separate release sheet. Typical linerless labels are disclosed in U.S. Pat. Nos. 5,292,713 and 4,978,415, and U.S. Pat. Nos. 5,354,588 and 5,417,783 and co-pending application Ser. Nos. 07/907,511 filed Jul. 1, 1992 and 08/078,918 filed Jun. 2, 1993, the disclosures of which are hereby incorporated by reference herein.

There are several major types of linerless labels that are common; repositional adhesive labels, removable adhesive labels and permanent adhesive labels. Different types of equipment are necessary in order to make these different types of linerless labels because of the widely divergent characteristics, drying methods, and the like of the adhesives and release coats that are used in the manufacture thereof. Since it is highly desirable to print or otherwise image the labels during manufacture thereof, equipment costs can be high to construct and maintain different equipment lines. Therefore if the demand for the different types of labels varies significantly, as often occurs in practice, some equipment may be left idle while other equipment is stressed to capacity.

According to the present invention a method and apparatus are provided which allow the alternative construction of either permanent adhesive or repositional adhesive labels utilizing the same equipment. According to the invention the changeover time from the manufacture of one type of labels to the other is short, and many of the components can be used for both types of labels despite their significant differences. This allows a minimum expenditure of capital and maximum flexibility in accommodating market needs.

According to one aspect of the present invention, apparatus is provided for alternatively manufacturing permanent adhesive or repositional adhesive linerless labels. The apparatus includes a plurality of components spaced from each other in a first direction which comprises the direction of travel of a web acted upon by the apparatus to produce the linerless labels. The components comprise the following: An indicia applying station. A first coating station for applying the tie coat in the construction of repositional adhesive labels. A second coating station for optionally applying a barrier coat in the construction of permanent adhesive labels, or repositional adhesive in the construction of repositional adhesive labels. A third coating station for applying a release coat in the construction of repositional adhesive labels. A dryer capable of drying both sides (faces) of a web at the same time, located downstream of the second coating station. A fourth coating station for applying a release coat in the construction of permanent adhesive labels. A release coat curing station for curing a release coat in the construction of permanent adhesive labels. And, a permanent adhesive application station.

The permanent adhesive application station includes a heated slot die head for applying hot melt adhesive. The die head has a length aligned with the web width, and provides a heat uniformity of ± five degrees F across the length, and an adhesive coat thickness of about ± 0.0001 inch across the length. Typically the coating thickness is about 0.0005–0.001 inches.

The heated slot die head has a main portion with die lips, having a length of about 16 inches and includes nine substantially uniformly spaced cartridge heaters along the length in a substantially straight line configuration having first and second ends. At least first and second temperature sensors are provided, one located between the second and third cartridges from each of the first and second ends of the straight line configuration. The head also includes a valve block and further comprises at least one cartridge heater and at least one temperature sensor disposed in the valve block. Control of the valve block cartridge heater(s) is independent of control of the cartridge heaters in the main portion.

Preferably the die lips are flat (having been ground that way) and form a slot between them through which the adhesive flows, e.g. to a thickness of about 0.0005–0.001 inches when provided as a coat on the web. The lips typically have a quadrate (e.g. rectangular) shape in cross section and each has a thickness of about 0.06 inches, and the slot between them has a thickness (corresponding to the spacing between the lips) of about 0.012 inches. Heat insulation is also provided to maintain heat and the uniformity of the heat across the die head, and also preferably the valve block.

The indicia applying section may comprise a variable intelligent imaging system such as ion deposition (e.g. MIDAX®, Indigo, Xeikon), ink jet, or like imaging equipment, and at least one print station such as that typically provided on an in-line web printing press, such as a Webtron press, available from Webtron of Fort Lauderdale, Fla. If four color printing of both sides of the linerless labels is desired, eight print stations will be provided.

The components may be in the sequence recited above (with the imaging system being the most upstream component and the permanent adhesive station the most downstream component in the first direction), or the sequence can be changed, as long as there is appropriate drying or curing of the various coats once applied.

A web unwind assembly is typically provided upstream of the variable intelligent imaging system in the first direction, and a web rewind assembly downstream of the permanent adhesive application station. A perf station for applying perfs in a second direction generally perpendicular to the first direction is also preferably provided typically before the second coating station. A video inspection station may be provided immediately adjacent and downstream of the perf station. A sheeter and longitudinal perf station may be disposed between the permanent adhesive station and the rewind assembly, and a metered infeed assembly may be provided between the unwind assembly and the imaging system.

The fourth coating station may comprise a UV silicone release coat application station. The release coat curing station may comprise a UV curing station including nitrogen inerted UV curing and an oxygen analyzer with a nitrogen flow control system. A turning mechanism may be associated with the variable intelligent imaging system and first coating station to allow two-sided imaging of a web used to produce the labels in a convenient manner, and bypass means (such as the diverter roll or rollers) may be provided for bypassing an individual component when not in use.

The invention also relates to a method of alternatively manufacturing either permanent adhesive linerless labels or repositional adhesive linerless labels utilizing common equipment. The method comprises the steps of automatically: (a) Continuously feeding a web of label substrate material having first and second faces so that it moves in a first direction. And while practicing step (a): (b) Imaging indicia on one or both of the faces of the web. Alternatively practicing step (c) or step (d) as follows: (c) If repositional adhesive linerless labels are being manufactured, applying and drying a tie coat to the first face of the web, applying a repositional adhesive to the first face of the web, applying a release coat to the second face of the web, and drying the release coat and repositional adhesive at the same time. (d) If permanent adhesive linerless labels are being manufactured, applying a barrier coat to the first face of the web, drying the barrier coat, and then applying a release coating over the barrier coat and curing the release coat, and applying a permanent adhesive to the second face. (e) Applying perfs to the web in a second direction substantially transverse to the first direction to define labels in the web. (f) Taking up the web after the practice of steps (b), (c) or (d), and (e); and (g) occasionally (e.g. periodically, intermittently, or typically simply when desired) changing over from step (c) to step (d), and vice versa. Step (b) is typically practiced using a flexo unit having at least one print cylinder. In that case there is the further step of immediately detaching the at least one print cylinder from the web when the common equipment is turned off. That is when a "stop" button on a control panel is pressed the print cylinders are immediately removed from ("thrown off") the web rather than waiting for the web to come to a natural stop. This reduces plate cleaning, web breaks, and waste, and improves print quality.

During the practice of step (c) a tie coat may be applied to the web first face prior to the repositional adhesive being applied to the first face. The barrier coat or the repositional adhesive may be applied by the same coater depending upon whether step (c) or step (d) is practiced. During the practice of step (c) the repositional adhesive and release coat are dried simultaneously by a two sided hot air dryer. Step (d) may be practiced by applying a UV silicone release coat, and UV curing release coat prior to the application of the permanent adhesive, which may be hot melt, water based or the like adhesives. Video inspection of the perfs formed after the practiced of step (e) may also be effected. The application of permanent adhesive and the barrier coat may be pattern coated or applied in a continuous format, depending on the particular application.

The invention also relates to a method of automatically manufacturing a web of permanent adhesive linerless labels from a web of substrate material having first and second faces. This method comprises the steps of: Imaging indicia on at least one face of the substrate. Optionally, perfing the substrate web to define labels. Alternatively, the labels may be severed from the web by a cutter and then fed to a sheeter to collect the cut labels in a stack. Applying a barrier coat to the first face of the substrate. Hot air drying the barrier coat. Applying a UV silicone release coat to the first face of the substrate. UV curing the UV silicon release coat. Applying a permanent adhesive to the second face of the substrate. And, taking up the web of linerless labels produced. The permanent adhesive applying step is preferably practiced by applying a hot melt permanent adhesive with a temperature uniformly of ± five degrees F across the width of the web, and with an adhesive coat thickness uniformity of ± about 0.0001 inches across the width of the web.

Permanent adhesive application is typically practiced using a heated slot die head as described above, and to apply an adhesive coating thickness of about 0.001 inches. The steps as recited above are preferably practiced sequentially. The repositionable adhesive and the tie coat may be pattern coated or applied in a continuous format, depending on the particular application.

The invention also contemplates a method of automatically manufacturing a web of repositional adhesive linerless labels from a web of substrate material having first and second faces. The method comprises the steps of: Imaging indicia on at least one face of the substrate. Optionally, perfing the substrate web to define labels. Applying a tie coat to the first face of the web and drying the tie coat. Applying a repositional adhesive to the first face of the substrate and a release coat to the second face. Simultaneously hot air drying the adhesive and release coats. And, taking up the web of repositional adhesive linerless labels produced. The repositional adhesive applying step is typically practiced using a flexographic unit having a print cylinder, and upon stopping of the practice of the imaging and repositional adhesive applying steps the print cylinder is provided in contact with the web a period of time (e.g. several seconds) only sufficient to wipe excessive adhesive off the print cylinder, and then the print cylinder is moved out of contact with the web. This prevents the excess adhesive from hardening on the unit, requiring the operator to chip it off. The steps recited above may be practiced sequentially.

It is the primary object of the present invention to provide a simple yet effective apparatus and method for the alternative manufacture of repositional adhesive linerless labels or permanent adhesive linerless labels. This and other objects of the invention will become clear from an inspection of the detailed description of the invention, and from the appended claims.

DETAILED DESCRIPTION OF THE DRAWINGS

Figure 1:
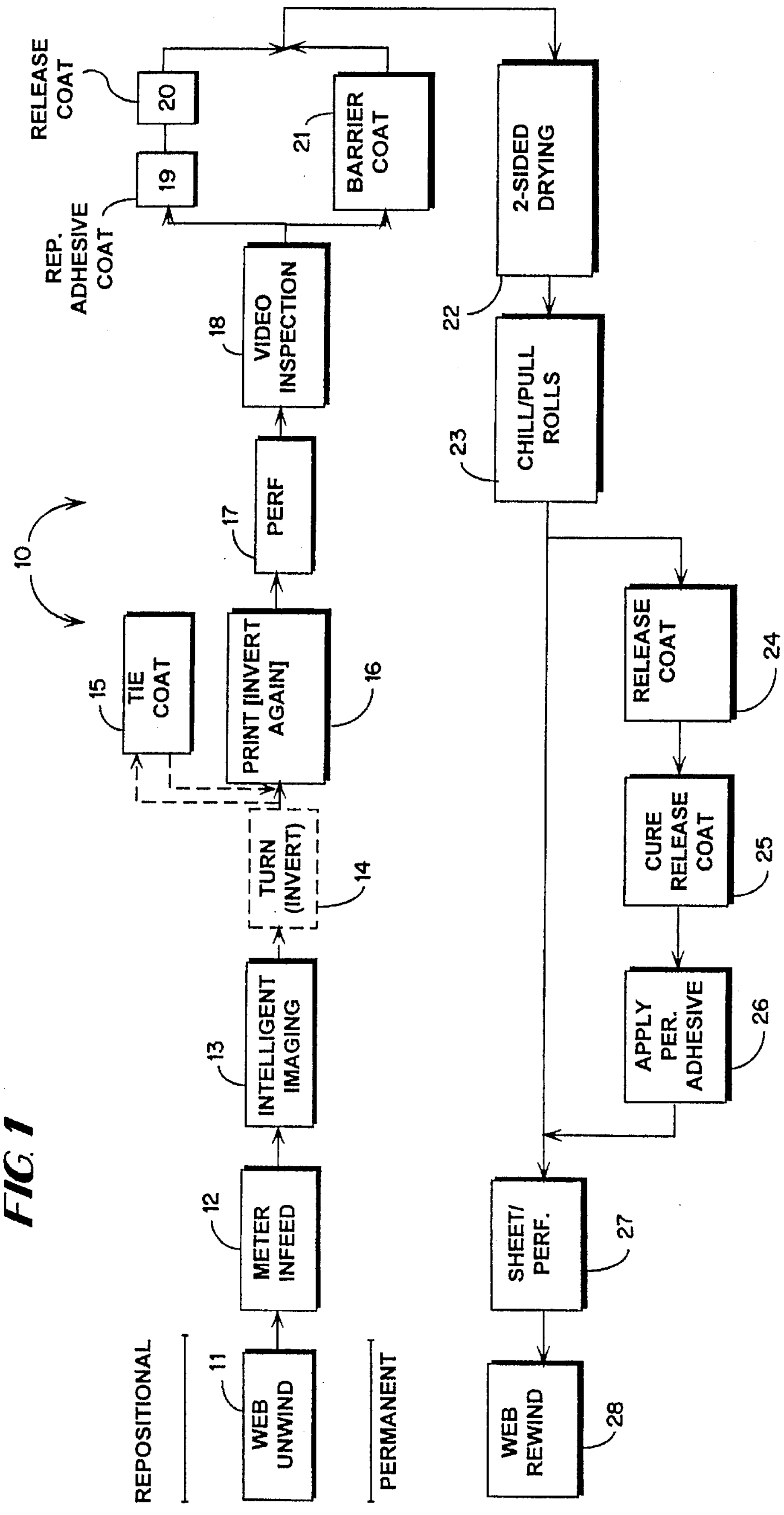
FIG. 1 is a schematic representation of the method steps that may be practiced according to the present invention.
Figure 3:
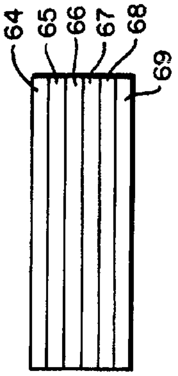
FIGS. 3 and 4 are schematic side views (greatly enlarged for clarity of illustration) of an exemplary repositional adhesive linerless label and an exemplary permanent adhesive linerless label, respectively, produced according to the present invention.
Figure 4:
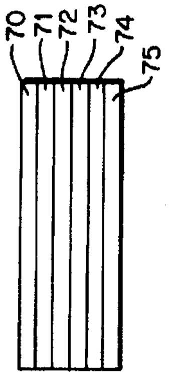

FIG. 1 schematically illustrates a process 10 which may be utilized to produce either repositional adhesive linerless labels (FIG. 3) or permanent adhesive linerless labels (FIG. 4). The steps that are used to produce both types of labels are shown in line, while those specific to the repositional adhesive label manufacture are shown above and those specific to the permanent adhesive label manufacture are shown below.

The web is typically unwound at box 11. A wide variety of webs may be utilized for the manufacture of the labels, and conventional web substrates include bond paper, coated papers, and films such as vinyl, polypropylene and polyethylene films. The web may be meter in-fed—as indicated by box 12—to an intelligent imaging stage, indicated at 13 in FIG. 1. Associated with the intelligent imaging stage 13 may an inverting stage indicated at 14. Where repositional adhesive labels are to be produced, a tie coat application stage 15 is provided, whereas for both types of labels one or a plurality of print stages—indicated schematically at 16 in FIG. 1—are provided.

Desirably perfing is done early in the web processing, as indicated at stage 17 in FIG. 1, horizontal perfs being optionally applied to define the different labels in the direction of web movement (the first direction), which is indicated schematically by the direction of arrows in FIG. 1. A video inspection station 18 may be provided after the perf station 17. After video inspection, the same equipment can be utilized to practice the repositional adhesive coat stage 19, or a barrier coat stage 21, for the repositional or permanent adhesive labels, respectively. A release coat station 20 for the manufacture of repositional adhesive labels is also desirably provided here in the sequence too.

After stages 19 through 21, drying is necessary, therefore the web passes to the drying stage 22. The drying stage 22 is capable of drying both faces or sides at the same time although if a barrier coat is applied to only one of the faces in the manufacture of permanent adhesive linings one of the heat sources associated with the dryer 22 can be turned off. Typically the heated web is cooled by being driven by the chill rolls of the chill roll take-up station 23. Normally downstream of the station 23 stages specific to the manufacture of permanent adhesive linerless labels are provided, i.e. the release coat stage 24, release coat curing stage 25, and permanent adhesive application stage 26.

After construction of the labels, in web form, they are often sheeted or longitudinally (in the first direction, the direction of web movement) perfed as indicated at stage 27, and then rewound as indicated at stage 28.

While a wide variety of materials may be used in each of the application stations set forth above, some materials have been found to be particularly useful. For example in the practice of step 21 barrier coatings available from Franklin International Corporation and sold under the trade name Duracet 122 may be applied, e.g. at a dry coat weight of about 3.76 grams per square meter ± 10%.

In the practice of step 24 a UV silicone coating is particularly useful since it not only provides the release coat for permanent adhesive moved against it, but also acts as a protective and visually pleasing coating over the product. Two different types of UV silicone products may be used. One is General Electric Silicone UV 9300 with photo initiator UV 9310C (2.5%). Another is Goldschmidt Silicone, such as a mix of Goldschmidt RC726 (65%) with RC711 (35%), with photo initiator 1173 (2%) added. Both UV silicones are typically provided at a dry coat weight of about 1.5 grams per square meter ± 10%. Other overcoatings, such as varnishes or the like, may be used to provide additional protective layers over the printing.

At the permanent adhesive application stage 26 hot melt permanent adhesive may be applied, such as Duratek 34-4144 available from National Starch. Application temperatures typically about 300°–350° F., and the dry coat weight is typically about 12.7–25.4 grams per square meter ± 10%. The hot melt adhesive cools and cures instantly, therefore no separate drying or curing stage is necessary.

In the practice of step 15 as described above, a desirable tie coat solution is 2.56 parts Cabosperse (20% solids) and one part polyvinyl alcohol (5% solids), applied with a dry coat weight of about 1.13 grams per square meter ± 10%.

The repositional adhesive added at station 19 may be any suitable commercially available repositional adhesive. One particularly desirable adhesive is CLEANTAC® adhesive available from Moore Business Form, Inc. of Lake Forest, Ill. This may typically be applied at a dry coat weight of about 9.4 grams per square meter ± 10%.

The release coat applied at station 20 preferably is an aqueous release coat, such as a solution of 20% Quillon C and 80% water. It may be applied with a dry coat weight of about 0.15 grams per square meter ± 10%. In this instance, Quillon or other similar release coatings provide protection for the indicia. Overprint varnishes or the like may also be provided.

Figure 2:
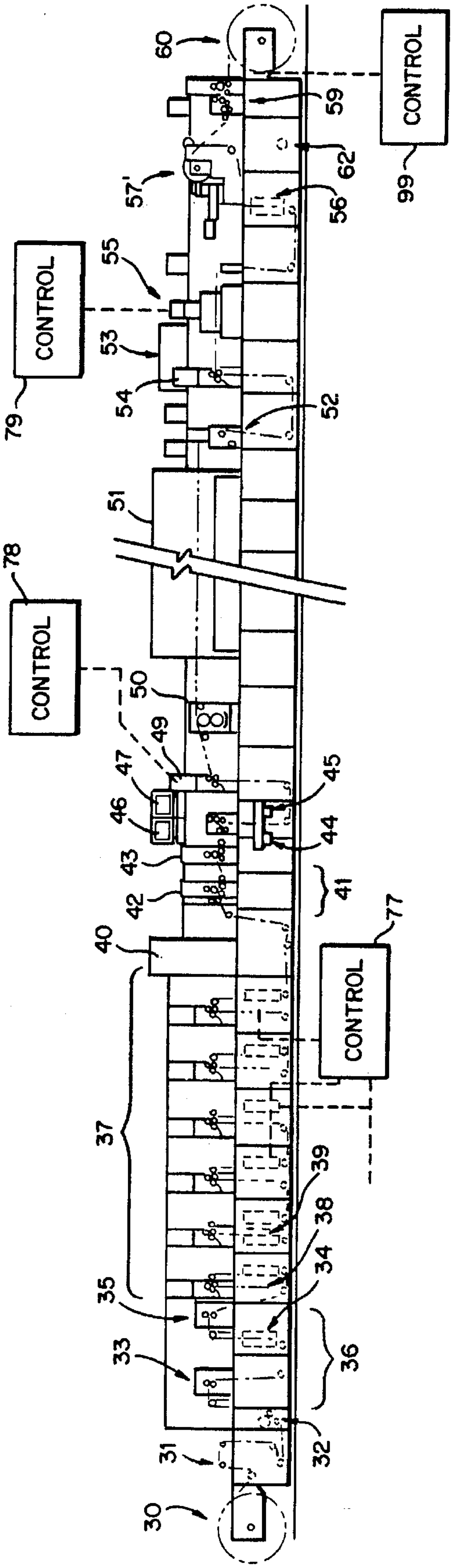
FIG. 2 is a side elevational view showing exemplary apparatus according to the present invention, for practice of the method of FIG. 1.

In order to practice the method schematically illustrated in FIG. 1, equipment such as illustrated in FIG. 2 may be utilized. The equipment is shown in FIG. 2 in a particularly advantageous sequence in the direction of web travel (from left to right in FIG. 2), however some of the stations may be moved around. For example the imaging and print stations described and illustrated may come after application of release or adhesive coats as long as the stations are capable of applying indicia to coated substrate.

One advantage of the equipment illustrated in FIG. 2 is that it is all commercially available. The basic equipment to which all the components are applied may be a lithographic press such as a Topman Moore TMSW2OV, available from Topman Moore Co., Ltd. of Japan, a flexographic press such as a Webiron 1618 press, or the like. In a typical sequence for the manufacture of permanent linerless labels the equipment may print, apply a barrier coat, dry, UV silicone coat, UV cure, apply hot melt adhesive, and rewind. In a typical repositional endless label process the equipment may apply and dry a tie coat, print, apply repositional adhesive, apply a release coat, dry both the adhesive and the release coat, and rewind. The equipment is capable of running at a normal operating speed of between 100 and 1500 feet per minute but preferably 500 feet per minute.

The first piece of equipment in the sequence illustrated in FIG. 2 comprises a web unwind apparatus 30, which is optionally followed by an edge guide 31 and a metered web infeed 32 apparatus. Then is provided intelligent imaging such as utilizing the intelligent imaging printheads 33, 35 which have a set of turn bars 34 disposed between them. The components 33 through 35 collectively form an intelligent imaging system 36, which may be of any suitable conventional type such as one employing ion deposition techniques 9 (e.g. MIDAX® printing technology, or Indigo or Xeikon technology), ink jet, laser or impact printer. Typically downstream of the intelligent imaging system 36 are a plurality of print stations indicated collectively at 37. Standard flexography or lithography can be used. Six stations 37 are illustrated in FIG. 2 but any number can be provided from one through eight. In the manufacture of repositional adhesive linerless labels typically the first print station 38 applies a tie coat, while the other stations print. In the embodiment illustrated in FIG. 2, then, in the manufacture of permanent linerless labels six color print stations are available while for repositional adhesive linerless labels five are available. Turn bars 39 may be provided as illustrated. The turn bars 34, 39 allow printing on both sides with ease.

As indicated schematically at 77 in FIG. 2, a control may be provided to stop the printing immediately upon actuation of a stop button. This may be referred to as an "impression throw off". Previous flexographic units leave the print cylinder in contact with the inking cylinder so that image is still being applied to the web even though the system is supposed to be stopped (the web continues to move). This lag time in slowing down the web leads to waste. In addition, leaving the print cylinder in contact with the inking means can cause the ink to dry on the print cylinder if the apparatus is shut down for several minutes (which it usually is) to change webs, reload the applicators or the like. If ink is allowed to dry and harden on the cylinder then inferior ink transfer might occur leading to reduced imaging. By immediately throwing off the print unit impressions upon actuation of the stop button, using control 77 [rather than waiting for the web to stop], plate cleansing is reduced as are web breaks and waste, and print quality is improved.

A main drive unit for a Webtron press is illustrated schematically at 40 in FIG. 2, followed by perf station 41, which may comprise two different single die perf units 42, 43. Video inspection is provided downstream of the perf station 41, as by video cameras 44, 45 having monitors 46, 47.

After video inspection a coater 49 is provided for alternatively applying the barrier coat when manufacturing permanent adhesive labels, or repositional adhesive when manufacturing repositional adhesive labels. The coater 49 is easily cleaned during changeover from one type of label to the other. Downstream of the coater 49 is another coater 50. The coater 50—which typically applies Quillon C release coat, in the manufacture of repositional adhesive labels—may comprise a 16.5 inch wide Dahlgren type coater.

When the coater 49 is used for applying repositional adhesive (e.g. aqueous adhesive), a control 78 may be provided therefor. Particularly where the coater 49 uses a flexo unit, control 78 controls it so that the "print cylinder" thereof is moved into contact with (or remains in contact with, or is otherwise provided in contact with) the paper web for a few seconds immediately after the press impression is turned off (and supply of adhesive is stopped). This serves to wipe the "print cylinder" of unit 49 to remove excess adhesive before the cylinder is moved to an "impression off" position. Wiping action occurs because the web continues to move a short period of time after the equipment has been turned off. If the control 78 is not utilized, the adhesive will dry in a few minutes of downtime, and has to be scraped off by the operator. After the passage of sufficient time to wipe off excess adhesive the control 78 effects movement of the "print cylinder" of coater 49 out of contact with the web.

After the application of the repositional adhesive on the same face to which the tie coat was applied, and the application of the release coat at 50 to the opposite face, in the manufacture of repositional adhesive labels, the labels pass to the dryer 51. In order to be able to dry both the release coat and the repositional adhesive easily and quickly at the same time, the dryer 51 preferably comprises an air flotation, two-sided dryer with two natural gas fired burners. Each burner can provide about 880,000 BTU/hr. The web temperature leaving the dryer is typically 230° F., and cooling is typically provided by acting on the web with the pull/chill rolls 52. Typically a pair of driven chill/pull rolls 52 are provided which are supplied with cooling water by a two ton chiller to cool the web down to about 150° F.

When permanent adhesive linerless labels are constructed and the coater 49 is used to apply the barrier coat, only one face of the web is "wet", therefore the dryer 51 preferably is provided with zone controls for each of the two faces so that drying action to one of the faces can be turned off when permanent adhesive labels are being constructed.

Downstream of the pull/chill rolls 52 is the coater 53 for applying the release coat (typically UV silicone) in the manufacture of permanent adhesive labels. The cure system 55 preferably is a Fusion UV curing system having 600 watts per inch power. Standard "H" bulbs are used for curing and a light shield provides nitrogen inerting. An oxygen analyzer 54 may be associated therewith to monitor oxygen levels and control nitrogen flow to the UV light shield. The UV cure system is illustrated schematically at 55. Nitrogen inerting is necessary for curing Goldschmidt UV silicone (which must occur at oxygen levels below 50 ppm) and in such case nitrogen flow is approximately 47 scfm, at 70° F. and 14.7 psi. A liquid nitrogen supply tank may be provided to supply the required flow and purity of nitrogen. Nitrogen inerting is not yet necessary for some UV curing systems, such as for GE 9300 silicone.

A control 79 may also be provided for the unit 55. The control 79 is connected to a conventional oxygen sensor which detects the present level of oxygen in the area of cure and then pumps in additional nitrogen to displace the oxygen if the level of oxygen approaches 50 ppm. While there is a level of curing of the silicone above the 50 ppm level, the percentage of cure decreases proportionally to the level of oxygen present. However, to have 100% curing of the silicone, the level of oxygen must remain below 50 ppm. The oxygen sensor is placed inside an existing light shield of the UV nitrogen insert system.

In the embodiment illustrated in FIG. 2, turn bars 56 are provided between the UV cure equipment 55 and the permanent adhesive application equipment 57. The equipment 57 preferably is for applying hot melt adhesive utilizing a hot melt slot die head. The hot melt adhesive is applied by the head to the web against an elastomer covered chill roll supplied with cooling water. For example an elastomer covering of about a half an inch thick (e.g. 90 durometer silicone) may be provided. A standard hopper type melt system with a gear pump may be used to deliver adhesive to the slot die head through a heated hose. The pump may be driven by a dc motor with a drive that tracks the press speed to maintain the constant coat weight up to the desired 500 feet per minute operation.

After permanent adhesive application, a sheeter/perf unit 59 may be provided to form sheets and/or longitudinal (in the direction of web movement) perfs. The unit 59 may comprise an in-line slitter. Rewind is provided by the apparatus 60, and since linerless labels are produced during rewind the adhesive face (whether permanent or repositional) of the web substrate comes against the release coat face, which it readily releases from when used by the consumer of the labels. A control 99 my be provided for the rewind apparatus 60. The control 99 provides constant tension in the rewind roll, and may be a conventional Dover Flexo Rewind Tension Control, available from Dover Flexo Electronics, Inc., Rochester, N.H.

For each of the pieces of equipment illustrated in FIG. 2, when the equipment is not being used it is "deactivated" either by cleaning it so that if the web moves past it no material is applied (e.g. for the coater 50), or a bypass means may be provided to bypass that piece of equipment. The bypass means may be of any suitable conventional type, such as one or more diverter rolls, loops, or the like. For example illustrated in dotted line and schematically at 62 in FIG. 2 is a diverter roll about which the web may be passed in order to bypass the hot melt adhesive applicator 57 if repositional adhesive labels are being constructed, in that case the web moving directly from preceding units to the apparatus 59.

FIGS. 3 and 4 schematically illustrate repositional adhesive and permanent adhesive linerless labels, respectively, that can be produced according to the invention using the method of FIG. 1 and the apparatus of FIG. 2. In FIG. 3 the release coat, e.g. Quillon C®, is provided on one face as indicated at 64, which may have printing (indicia) 65 below it, followed by the substrate of the web (e.g. paper) 66. On the opposite side of the paper web 66 may be the tie coat 67 with printing (indicia) 68 thereon, and with the repositional adhesive 69 on the opposite face from the release coat 64.

For the permanent adhesive linerless label illustrated in FIG. 4, one face is provided by the release coat (e.g. UV silicone) 70, adjacent the barrier coat 71. Printing/indicia 72 may be provided between the barrier coat 71 and the web substrate (e.g. paper) 73. On the opposite side of the paper 73 may be additional printing/indicia 74, and then the hot melt or like permanent adhesive 75 on the opposite face from the release coat 70. It is understood that during the manufacture of either repositional or permanent labels, the adhesive may be pattern coated or applied in a continuous fashion. Likewise, the barrier and tie coats may also be pattern coated or applied continuously to match the coating of the adhesive.

Figure 5:
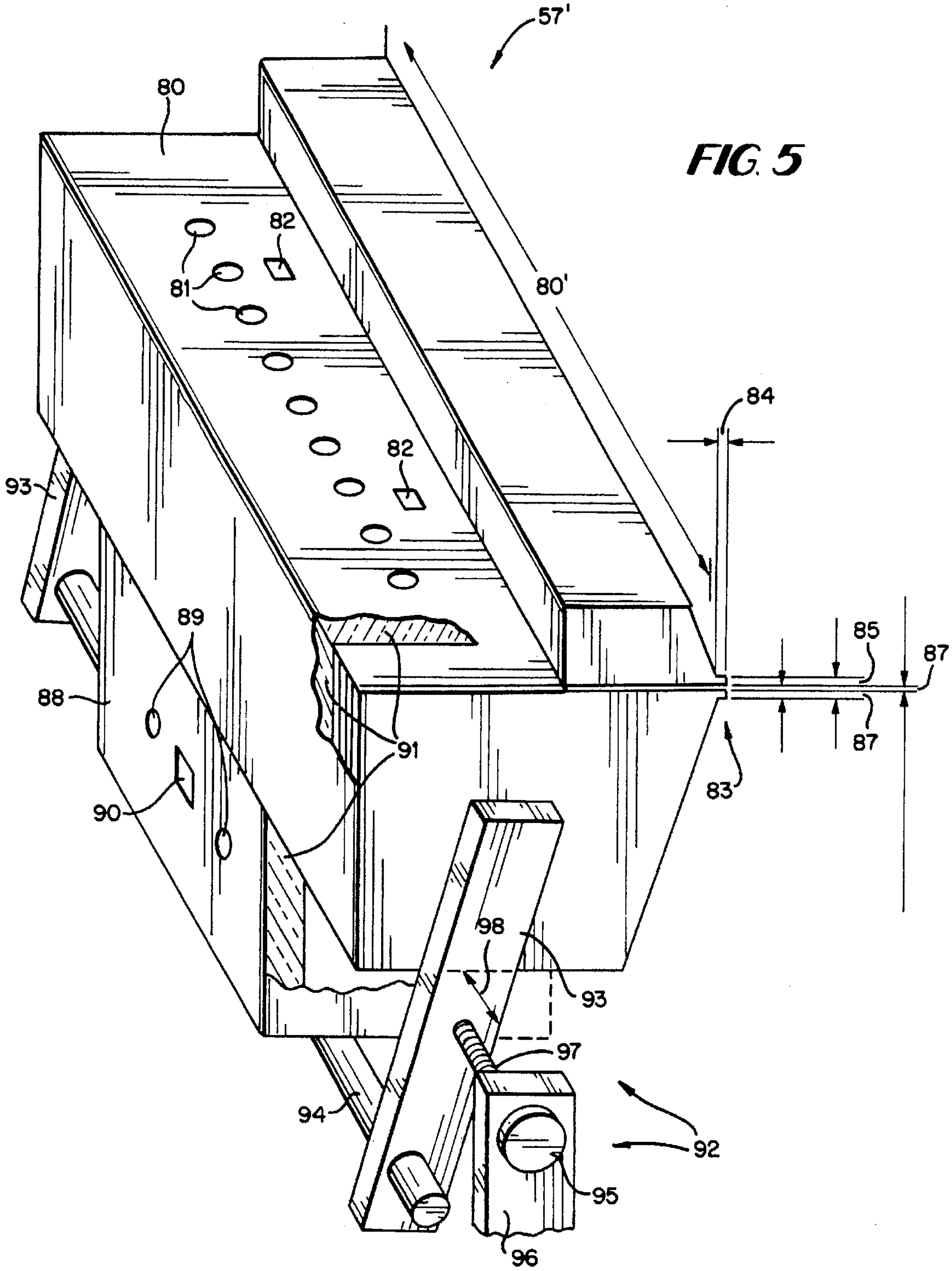
FIG. 5 is a schematic perspective view of a particular permanent adhesive die head that may be utilized according to the invention.

Alternative permanent adhesive application equipment is shown generally by reference numeral 57' in FIG. 5, comprising a heated slot die head for applying hot melt adhesive. The head 57' has a main portion 80 with a length 80' aligned with the web width, which typically may be about 16 inches. The head 57' provides a heat uniformity of ± five degrees F across the length 80'. It also provides an adhesive coat thickness uniformly of about ± 0.0001 inch across the length 80. If the hot melt dispenser has an uneven temperature across its face (e.g. a temperature difference of as little as 20 degrees F, e.g. 300 degrees F at one end and 320 degrees F at the other) this can cause several problems. If the temperature is too great, the adhesive is burn. If one end of the dispensing device is warmer than the other end, the adhesive coming out of the warmer end will flow at a greater rate since it is more fluid than at the other end, resulting in an uneven coating of the adhesive and defects on the product.

The uniformity of the heat and coating weight that is achieved by the head 57' is accomplished in a number of different manners. Firstly, for a 16 inch length 80', nine conventional heater cartridges 81 are provided in a substantially straight line configuration having first and second ends, and at least first and second conventional temperature sensors 82 are provided, the sensors 82 located between the second and third cartridges 81 from each of the first and second ends of the straight line configuration. A prior art slotted die head that was used which had the nonuniformity problem described above had only seven cartridge heaters 81, and the temperature sensors 82 were positioned differently. The configuration illustrated in FIG. 5 solves the uniformity problem.

The main portion 80 of the head 57' also includes die lips, shown generally at reference numeral 83. The lips 83 have been reshaped compared to the prior art slotted die head, and reground flat. As seen in FIG. 5, the lips 83 have a quadrate (e.g. rectangular) shape in cross section and each lip 83 has a lip depth (indicated by reference numeral 84 in FIG. 5) of about 0.06 inches, and a thickness—indicated by dimensions 85 and 86 in FIG. 5—of about 0.6 inches. The lips 83 also have a slot 87 defined between them, corresponding to the spacing between the lips 83, the slot 87 having a thickness of about 0.012 inches, and typically applying a hot melt adhesive coating weight (thickness) of about 0.0005–0.001 inches to the web.

The head 57' also has a valve block 88. According to the present invention, again to provide greater uniformity of temperature, in the valve block 88 at least one conventional cartridge heater 89 is provided, and at least one conventional temperature sensor, preferably two cartridges 89 being provided with a single temperature sensor 90 between them as illustrated in FIG. 5. The cartridges 89 are like the cartridges 81, and the temperature sensor 90 like the sensors 82. Also, thermal insulation of any suitable conventional type (capable of withstanding the approximately >300 degree F temperature of the head 57' without degradation) is provided covering the main body portion 80 and the valve block 88. Such insulation is illustrated schematically at 91 in FIG. 5. Only a small portion of the insulation 91 is illustrated in FIG. 5 for clarity of illustration, but the insulation will cover the vast majority of the main body portion 80 and the valve block 88.

The cartridges 81 are connected up to a source of electricity and turned on, off, or the heat provided thereby is controlled in response to the temperature sensors 82. The cartridges 89 are also connected up to a source of electricity and are controlled by the temperature sensor 90. The control of the cartridges 89 is independent of the control of the cartridges 81.

The die head 57' also has sideways register adjustment indicated generally by reference numeral 92. This is accomplished by providing mounting blocks 93 on opposite sides of the main portion 80 of the head 57', which are adapted to slide on a guide rod 94 that is fixed (in a manner not shown in FIG. 5). A knob 95 is associated with stationary support 96 and includes a threaded rod 97 extending through corresponding threads in the support 96, so that by rotating the knob 95, the shaft 97 will be rotated and adjust the position of the main body 80 in the dimension 98. This allows proper registration of the lips 83 with the paper web to which the hot melt adhesive is to be applied. The rod 97 is typically connected to the near support 93 as seen in FIG. 5 by a traveling nut arrangement or the like.

In the construction of the head 57' it is also desirable to stress relieve by annealing, to prevent creep and resulting head deformation.

It will thus be seen that according to the present invention an advantageous method and apparatus are provided for alternatively constructing permanent adhesive or repositional adhesive linerless labels, with a minimum of changeover time and difficulty, to accurately and easily apply a desired coat of adhesive, and utilizing many equipment components in common so as to minimize capital expenditure and equipment attention. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for alternatively manufacturing permanent adhesive or repositional adhesive linerless labels, comprising a plurality of components spaced from each other in a first direction which comprises the direction of travel of a web acted upon by the apparatus to produce linerless labels, said components comprising:

an indicia applying station;

a second coating station for optionally applying a barrier coat in the construction of permanent adhesive labels, or repositional adhesive in the construction of repositional adhesive labels;

a third coating station for applying a release coat in the construction of repositional adhesive labels;

a dryer capable of drying both sides of a web at the same time, located downstream of said second coating station;

a fourth coating station for applying a release coat in the construction of permanent adhesive labels;

a release coat curing station for curing a release coat in the construction of permanent adhesive labels;

a permanent adhesive application station;

wherein said permanent adhesive application station includes a heated slotted die head for applying hot melt adhesive having a length aligned with the web width, and providing a heat uniformity of ± five degrees F across said length, and an adhesive coat thickness uniformity of about ± 0.0001 inch across said length:

wherein said heated slotted die head has a main portion, with die lips, having length of about 16 inches, and includes nine substantially uniformly spaced cartridge heaters along said length in a substantially straight line configuration having first and second ends, and also includes at least first and second temperature sensors, one located between the second and third cartridges from each of said first and second ends of said straight line configuration;

wherein said heated slotted die head also includes a valve block and;

at least one cartridge heater and at least one temperature sensor disposed in said valve block, and wherein control of said valve block at least one cartridge heater is independent of control of said cartridge heaters in said main portion.

2. Apparatus as recited in claim 1 wherein said heated slotted die head has a main portion with die lips; and wherein said lips are flat and form a slot therebetween through which adhesive flows.

3. Apparatus as recited in claim 2 wherein said lips have a quadrate shape in cross-section, and each has a thickness of about 0.06 inches.

4. Apparatus as recited in claim 3 wherein said slot has a thickness, corresponding to the spacing between said lips, of about 0.012 inches, an adhesive coating thickness of about 0.0005–0.001 inches being provided.

5. Apparatus as recited in claim 1 wherein said heated slotted die head is provided with heat insulation to maintain heat and the uniformity of the heat thereacross.

6. Apparatus as recited in claim 5 also includes further comprising heat insulation provided with said valve block.

7. Apparatus as recited in claim 1 wherein said heated slotted die head main portion has die lips; and wherein said lips are flat and form a slot therebetween through which adhesive flows.

8. Apparatus as recited in claim 7 wherein said lips have a quadrate shape in cross-section, and each has a thickness of about 0.06 inches, and wherein said slot has a thickness, corresponding to the spacing between said lips, of about 0.012 inches, typically providing an adhesive coating thickness of about 0.0005–0.001 inches.

9. Apparatus as recited in claim 5 wherein said heated slotted die head has a main portion with die lips; and wherein said lips are flat and form a slot therebetween through which adhesive flows.

10. Apparatus as recited in claim 9 wherein said lips have a quadrate shape in cross-section, and each has a thickness of about 0.06 inches and wherein said slot has a thickness, corresponding to the spacing between said lips, of about 0.012 inches.

11. A method of automatically manufacturing a web of permanent adhesive linerless labels from a web of substrate material having first and second faces, comprising the steps of:

(a) imaging indicia on at least one face of the substrate;

(b) perfing the substrate web to define labels;

(c) applying a barrier coat to the first face of the substrate;

(d) hot air drying the barrier coat;

(e) applying a UV silicone release coat to the first face of the substrate;

(f) UV curing the UV silicone release coat;

(g) applying a permanent adhesive to the second face;

(h) taking up the web of linerless labels produced; and wherein step (g) is practiced by applying a hot melt permanent adhesive with a temperature uniformity of ± five degrees F across the width of the web and with an adhesive coat thickness uniformity of ± about 0.0001 inches across the width of the web, and wherein step (g) is further practiced by using a heated slotted die head having a main portion with die lips, temperature sensors, and cartridge heaters, and a valve portion with at least one cartridge heater and temperature sensor; and controlling the cartridge heaters in the main portion separately and distinctly from the at least one cartridge heater in the valve portion, using the temperature sensors in the main portion for control of the main portion cartridge heaters, and the at least one temperature sensor in the valve portion for control of the valve portion at least one cartridge heater.

12. A method as recited in claim 11 wherein said steps are practiced sequentially.

13. A method as recited in claim 11 wherein step (g) is practiced using a heated slotted die head having die lips that are flat and form a slot therebetween through which adhesive flows, the lips having a quadrate shape in cross-section, and each having a thickness of about 0.06 inches and defining a slot having a thickness, corresponding to the spacing between the lips, of about 0.012 inches, to apply an adhesive coating thickness of about 0.0005–0.001 inches.

14. A method of automatically manufacturing a web of repositional adhesive linerless labels from a web of substrate material having first and second faces, comprising the steps of:

(a) applying a tie coating to the first of the substrate;

(b) imaging indicia on at least one face of the substrate;

(c) perfing the substrate web to define labels;

(d) applying a repositional adhesive to the first face of the substrate and a release coat to the second face;

(e) simultaneously hot air drying the adhesive and release coats;

(f) taking up the web of repositional adhesive linerless labels produced; and wherein step (d) is practiced using a flexographic unit having a print cylinder, and wherein upon stopping the practice of steps (b) and (d) the print cylinder is provided in contact with the web a period of time only sufficient to wipe excess adhesive off the print cylinder, and then the print cylinder is moved out of contact with the web.

15. A method as recited in claim 14 wherein said steps are practiced sequentially.

16. Apparatus for alternatively manufacturing permanent adhesive or repositional adhesive linerless labels, comprising a plurality of components spaced from each other in a first direction which comprises the direction of travel of a web acted upon by the apparatus to produce linerless labels, said components comprising:

an indicia applying station;

a second coating station for optionally applying a barrier coat in the construction of permanent adhesive labels, or repositional adhesive in the construction of repositional adhesive labels;

a third coating station for applying a release coat in the construction of repositional adhesive labels;

a dryer capable of drying both sides of a web at the same time, located downstream of said second coating station;

a fourth coating station for applying a release coat in the construction of permanent adhesive labels;

a release coat curing station for curing a release coat in the construction of permanent adhesive labels;

a permanent adhesive application station;

wherein said permanent adhesive application station includes a heated slotted die head for applying hot melt adhesive having a length aligned with the web width, and providing a heat uniformity of ± five degrees F across said length, and an adhesive coat thickness uniformity of about ± 0.0001 inch across said length; wherein said heated slotted die head has a main portion, with die lips, having length of about 16 inches, and includes nine substantially uniformly spaced cartridge heaters along said length in a substantially straight line configuration having first and second ends, and also includes at least first and second temperature sensors, one located between the second and third cartridges from each of said first and second ends of said straight line configuration;

wherein said heated slotted die head includes a valve block; and at least one cartridge heater and at least one temperature sensor disposed in said valve block, control of said at least one cartridge heater in said valve block independent of any other cartridge heaters.

* * * * *